US009626575B2

(12) United States Patent
Li et al.

(10) Patent No.: US 9,626,575 B2
(45) Date of Patent: Apr. 18, 2017

(54) VISUAL LIVENESS DETECTION

(71) Applicant: International Business Machines Corporation, Armonk, NY (US)

(72) Inventors: Min Li, Beijing (CN); Wen Liu, Beijing (CN); Yong Qin, Beijing (CN); Zhong Su, Beijing (CN); Shi Lei Zhang, Beijing (CN); Shiwan Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 14/821,258

(22) Filed: Aug. 7, 2015

(65) Prior Publication Data

US 2017/0039440 A1 Feb. 9, 2017

(51) Int. Cl.
| | | |
|---|---|---|
| G10L 25/57 | (2013.01) | |
| G10L 13/00 | (2006.01) | |
| G06K 9/00 | (2006.01) | |
| G10L 13/027 | (2013.01) | |
| G10L 15/04 | (2013.01) | |
| G10L 15/25 | (2013.01) | |

(52) U.S. Cl.
CPC ..... *G06K 9/00906* (2013.01); *G06K 9/00281* (2013.01); *G10L 13/027* (2013.01); *G10L 15/04* (2013.01); *G10L 15/25* (2013.01); *G10L 25/57* (2013.01)

(58) Field of Classification Search
CPC ......... G06K 9/00073; G06K 9/00114; G06K 9/0012; G06K 2009/0006; G06K 9/00006

USPC .................................................. 704/270, 259
See application file for complete search history.

(56) References Cited

U.S. PATENT DOCUMENTS

| | | | |
|---|---|---|---|
| 7,343,289 B2 * | 3/2008 | Cutler | G10L 15/25 704/259 |
| 8,261,090 B1 | 9/2012 | Matsuoka | |
| 8,442,824 B2 | 5/2013 | Aley-Raz et al. | |
| 8,582,835 B2 | 11/2013 | Cavallini | |
| 2013/0015946 A1 | 1/2013 | Lau et al. | |

OTHER PUBLICATIONS

Chetty et al., "Biometric person authentication with liveness detection based on audio-visual fusion", ResearchGate, International Journal of Biometrics, vol. 1, No. 4, Jan. 2009,Copyright © 2009 Inderscience Enterprises Ltd., pp. 463-478, <http://www.researchgate.net/publication/228819905_Biometric_person_authentication_with_liveness_detection_based_on_audio-visual_fusion>.

(Continued)

Primary Examiner — Charlotte M Baker
(74) Attorney, Agent, or Firm — Maeve Carpenter

(57) ABSTRACT

In an approach for visual liveness detection, a video-audio signal related to a speaker speaking a text is obtained. The video-audio signal is split into a video signal which records images of the speaker and an audio signal which records a speech spoken by the speaker. Then a first sequence indicating visual mouth openness is obtained from the video signal, and a second sequence indicating acoustic mouth openness is obtained based on the text and the audio signal. Synchrony between the first and second sequences is measured, and the liveness of the speaker is determined based on the synchrony.

18 Claims, 6 Drawing Sheets

(56) References Cited

OTHER PUBLICATIONS

Chetty, Girija, "Detecting Liveness in Multimodal Biometric Security Systems", IJCSNS International Journal of Computer Science and Network Security, vol. 9, No. 10, Oct. 2009, pp. 16-22.
Sengupta et al., "Automated Lip Reading Technique for Password Authentication", International Journal of Applied Information Systems (IJAIS), vol. 4, No. 3, Sep. 2012, New York, USA, pp. 18-24.

* cited by examiner

VISUAL LIVENESS DETECTION

BACKGROUND

The present invention relates generally to identity authentication technology, and more specifically, to visual liveness detection for a speaker in speaker verification.

With widespread use of mobile Internet applications, such as mobile banking applications, mobile purchase applications, and mobile payment applications, mobile security becomes more and more important.

Generally an important technology for the mobile security is identity authentication technology, which verifies an identity of a person. Currently the identity authentication technology based on biological characteristics becomes more popular, for example, facial recognition, fingerprint identification, and iris recognition.

Facial recognition is a technology which utilizes facial features to authenticate a person. Firstly an image or video containing a face of a person is captured by a camera. The face in the image or video is detected or tracked. Then the facial features of the face are extracted and matched to recognize the face, and thus the identity of the person can be verified. However the facial recognition utilizes the face image which is static, so it would happen that a person uses another person's facial photo or a video about another person to impersonate another person for identity authentication.

Therefore visual liveness detection for a person is proposed to prevent impersonation in the identity authentication. A conventional approach for liveness detection is eye-blinking detection, which can determine the liveness of a person by detecting the eye-blinking action. However the eye-blinking detection cannot differentiate the real-time eye-blinking action from the eye-blinking action from a recorded video.

Another conventional approach for liveness detection is facial expression detection, which can determine the liveness of a person by asking the person to show a specified expression and detecting whether the specified expression is correctly shown. However the facial expression detection is not user-friendly and the number of expressions is limited.

SUMMARY

According to one embodiment of the present invention, there is provided a computer-implemented method. In the method, a video-audio signal related to a speaker speaking a text is obtained. Then the video-audio signal is split into a video signal which records images of the speaker and an audio signal which records a speech spoken by the speaker. A first sequence indicating visual mouth openness is obtained from the video signal, and a second sequence indicating acoustic mouth openness is obtained based on the text and the audio signal. Synchrony between the first and second sequences is measured, and the liveness of the speaker is determined based on the synchrony.

According to another embodiment of the present invention, there is provided a system. The system comprises one or more processors, a memory coupled to at least one of the processors and a set of computer program instructions. The set of computer program instructions are stored in the memory and executed by at least one of the processors in order to perform actions of obtaining a video-audio signal related to a speaker speaking a text, splitting the video-audio signal into a video signal which records images of the speaker and an audio signal which records a speech spoken by the speaker, obtaining a first sequence indicating visual mouth openness from the video signal, obtaining a second sequence indicating acoustic mouth openness based on the text and the audio signal, measuring synchrony between the first and second sequences, and determining liveness of the speaker based on the synchrony.

According to another embodiment of the present invention, there is provided a computer program product. The computer program product comprises a computer readable storage medium having program instructions embodied therewith. The program instructions are executable by a processor to cause the processor to obtain a video-audio signal related to a speaker speaking a text, to split the video-audio signal into a video signal which records images of the speaker and an audio signal which records a speech spoken by the speaker, to obtain a first sequence indicating visual mouth openness from the video signal, to obtain a second sequence indicating acoustic mouth openness based on the text and the audio signal, to measure synchrony between the first and second sequences, and to determine liveness of the speaker based on the synchrony

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
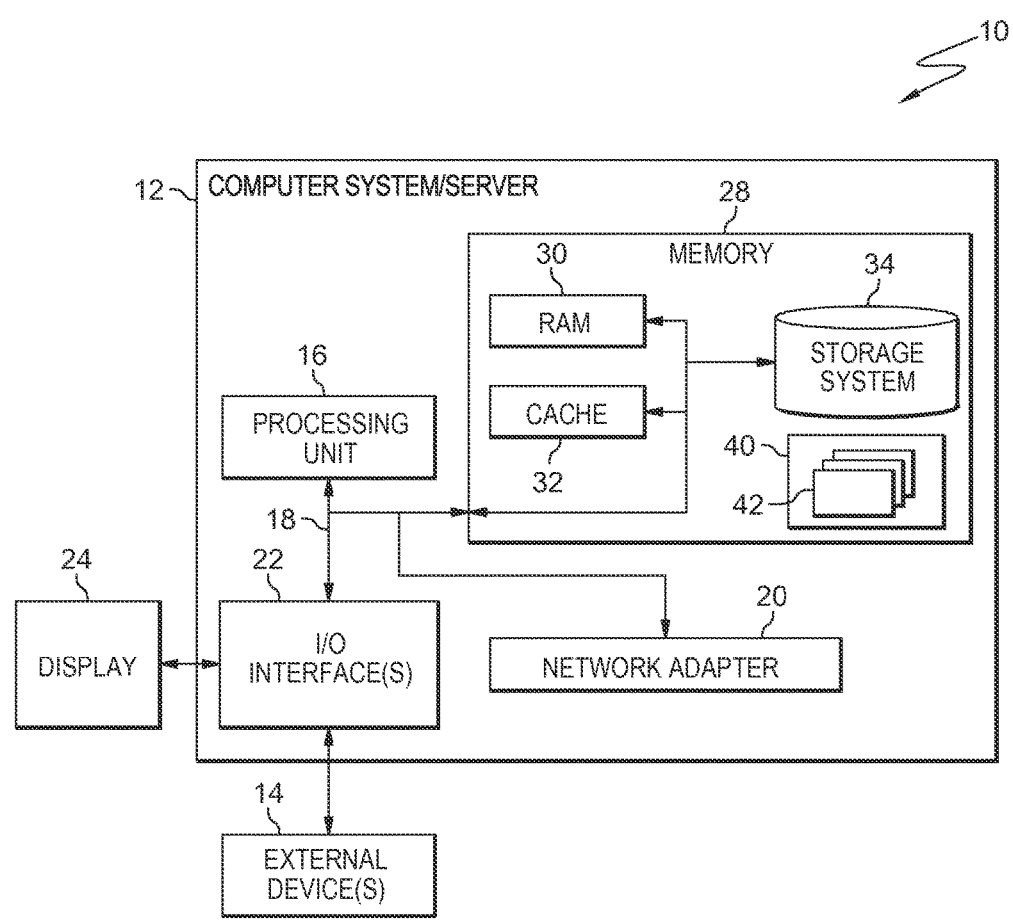
FIG. 1 is a block diagram depicting components of a data processing system, in accordance with embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
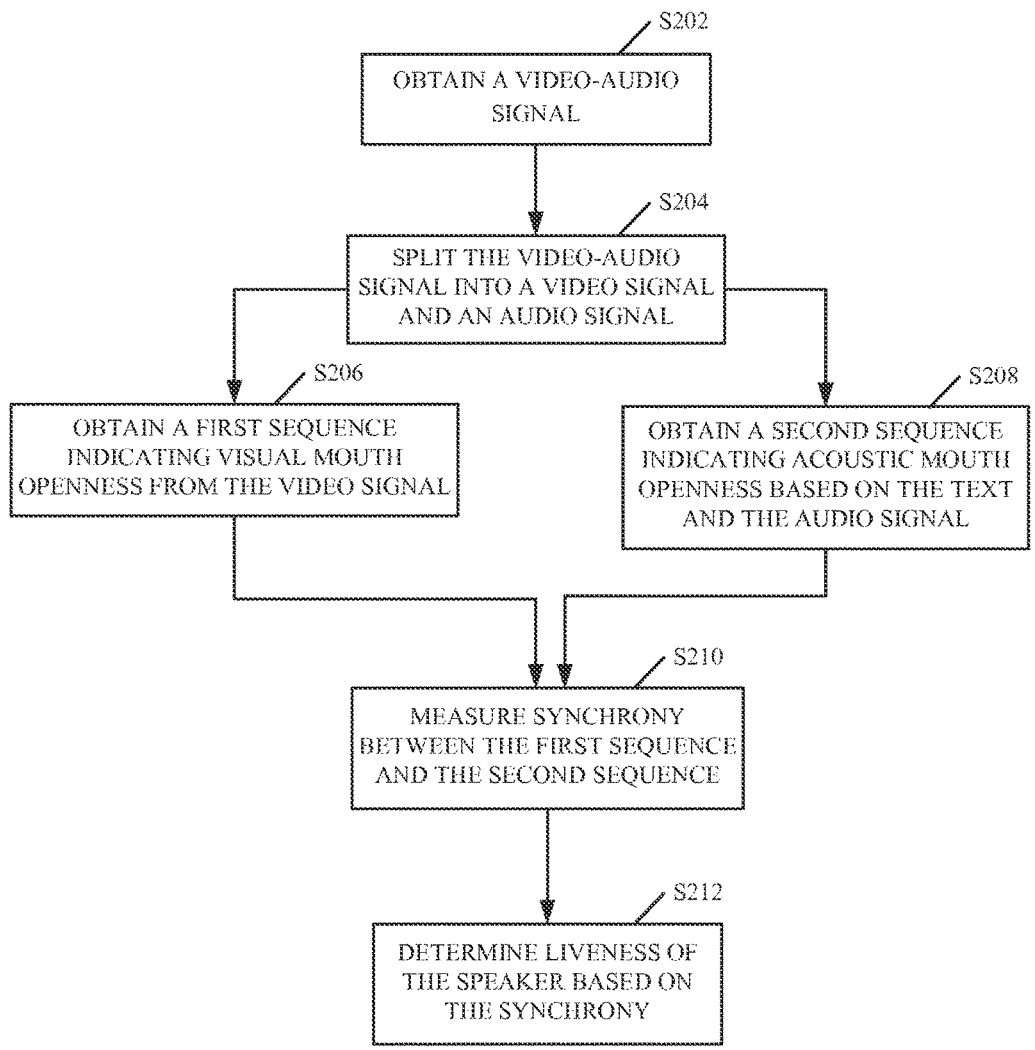
FIG. 2 is a schematic flowchart of the computer-implemented method for visual liveness detection, in accordance with embodiments of the present invention.

With reference now to FIG. 2, it shows the flowchart of the computer-implemented method for visual liveness detection according to an embodiment of the present invention. The embodiment will be described in detail below in conjunction with the figures.

The visual liveness detection of the embodiment of the present invention is based on audio-visual synchrony. When a person speaks, some phonemes need the person to open his/her mouth, and some phonemes need the person to close his/her mouth. At the same time it can be observed visually whether the person opens his/her mouth when he/she speaks. By checking the synchrony between the mouth openness corresponding to the phonemes and the visual mouth openness, it can be determined whether the person speaks the correct phonemes.

As shown in FIG. 2, at step S202, a video-audio signal related to a speaker speaking a text is obtained by, for example, program modules 42 of FIG. 1. In the embodiment, the signal will be provided after the speaker is asked to speak a text. The text may be any phrase or sentence dynamically generated or may be an answer for a question which is provided by the speaker in advance. Thus the text could be different for different speaker. The signal can be generated by a camera capturing images of the speaker and recording the speech that the speaker speaks.

At step S204, the video-audio signal is split into two signals, i.e. a video signal which records the images of the speaker, and an audio signal which records the speech. As known, the video signal and the audio signal are carried on different channels, and such split would not affect integrity or quality of the video and audio signals. The video-audio signal split is known for those skilled in the art, and any of the existing method for splitting can be used.

Then at step S206, a first sequence indicating visual mouth openness is obtained from the video signal. In this embodiment, the mouth openness can be represented by a mouth-open-status. The mouth-open-status can be defined to have two values, for example 0 and 1, one (value 1) of which indicates mouth open, and the other (value 0) indicates mouth close.

A person skilled in the art will appreciate that the mouth-open-status may be defined to have more than two values to refine the mouth openness. For example, the mouth-open-status may be defined to have three values, such as 0, 1 and 2. Value 0 can be defined to indicate the mouth close, value 1 can be defined to indicate the mouth half-open, and value 2 can be defined to indicate the mouth open.

Figure 3:
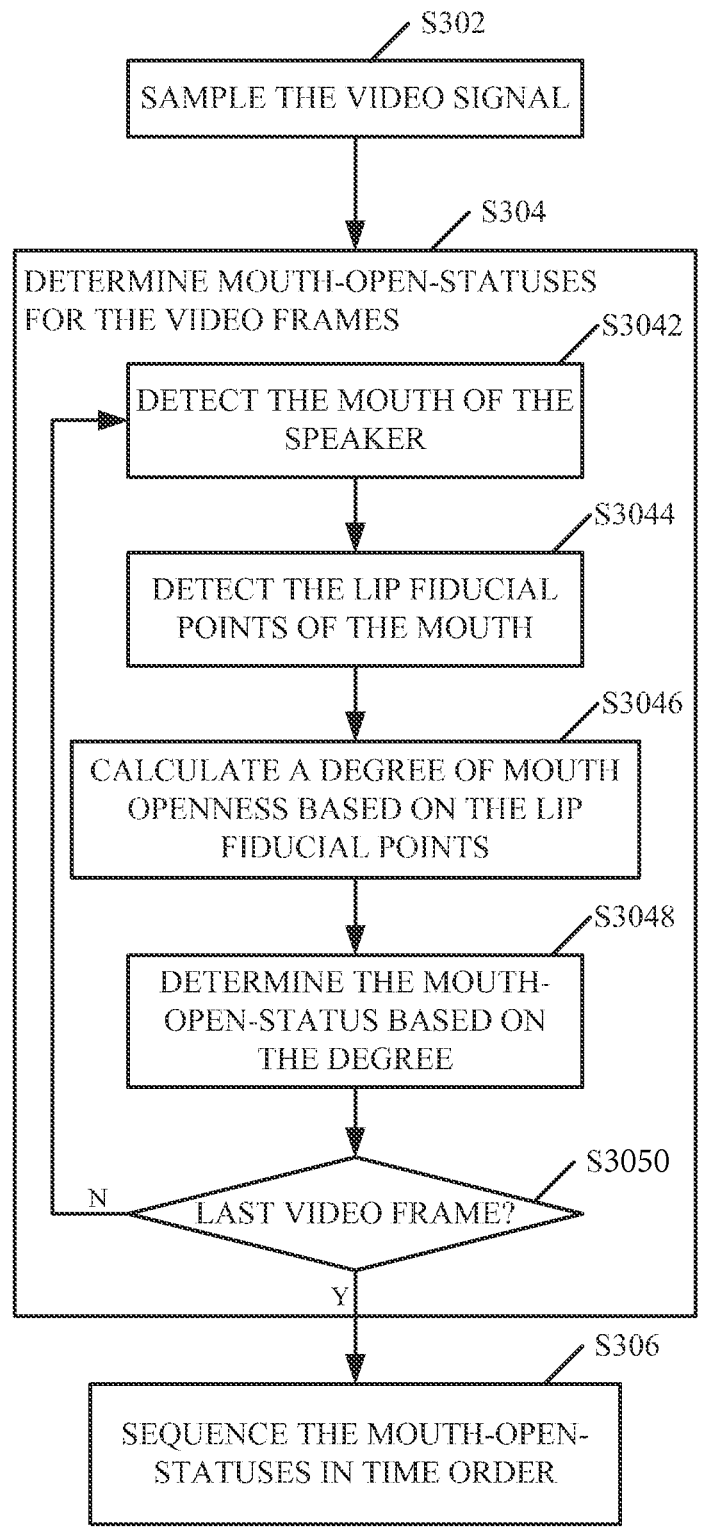
FIG. 3 is a schematic flowchart illustrating the process of obtaining the first sequence, in accordance with embodiments of the present invention.

FIG. 3 shows a schematic flowchart illustrating the process of obtaining the first sequence (step S206). As shown in FIG. 3, at step S302, the video signal is sampled to obtain a plurality of video frames. Thus the video signal becomes a sequence of video frames in time order. As an example, assume that the video signal can be sampled with a sampling time of 50 milliseconds (ms), i.e. 20 frames per second, a sequence of 40 video frames can be obtained for the video signal with a length of 2 seconds. The sampling time can be varied as required. The shorter the sampling time is, the more the video frames are, and thus the finer grained mouth openness can be obtained.

Then at step S304, the mouth-open-status of the speaker is determined for each video frame of the video signal. Firstly at step S3042, for each video frame, the mouth of the speaker in the video frame is detected. It is known for those skilled in the art how to detect the mouth in the video frame, and any existing method for detection of mouth can be used.

At step S3044, lip fiducial points of the mouth are detected. The lip fiducial points are the points with which the lip profile can be determined. In an embodiment, a lip fiducial point model can be pre-established and employed to detect the lip fiducial points.

Figure 4:
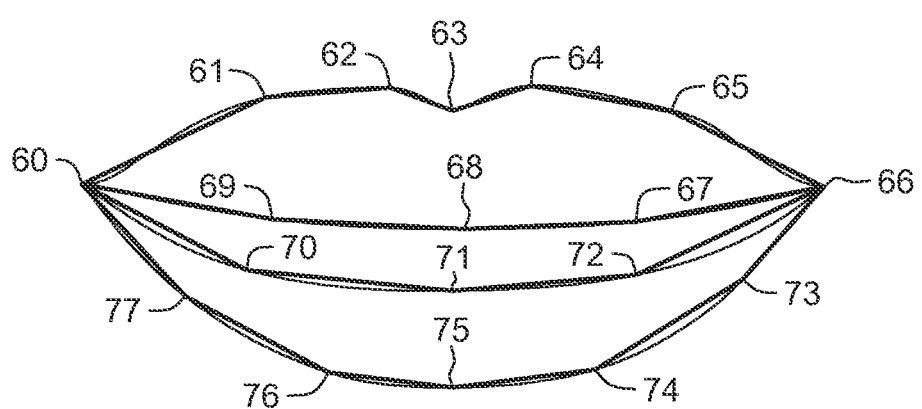
FIG. 4 illustrates an example for calculating a degree of mouth openness, in accordance with embodiments of the present invention.

Then at step S3046, a degree of mouth openness is calculated based on the lip fiducial points. FIG. 4 shows an example of calculating the degree of mouth openness. As shown in FIG. 4, there are eighteen lip fiducial points 60, 61, 62, . . . , 69, 70, 71, . . . , 75, 76, 77. The lines between the lip fiducial points 60, 61, 62, 63, 64, 65, 66, 73, 74, 75, 76, 77 form a first region, and the lines between the lip fiducial points 60, 69, 68, 67, 66, 72, 71, 70 form a second region. The degree of mouth openness can be calculated as an area ratio of the second region to the first region.

Then at step S3048, The mouth-open-status is determined based on the degree of mouth openness. If the degree of mouth openness is higher than a predetermined threshold, it indicates the mouth open, and the mouth-open-status can be set to value 1. If the degree of mouth openness is lower than the predetermined threshold, it indicates the mouth close, and the mouth-open-status can be set to value 0.

Then at step S3050, a determination is made whether the last video frame is sampled. Responsive to a determination that the last video frame is sampled (YES branch, S3050), the mouth-open-statuses of the video frames are sequenced in time order to generate the first sequence (step S306). Responsive to a determination that the last video frame has is not sampled (NO branch, S3050), for each remaining video frame, the mouth of the speaker in the video frame is detected (step S3042).

The steps S3042 to S3050 are repeated for each video frame, and the mouth-open-statuses of all the video frames can be determined. Then at step S306, the mouth-open-statuses of the video frames are sequenced in time order to generate the first sequence. For the above-mentioned example, the first sequence includes 40 mouth-open-statuses with a time length of 2 seconds.

Back to FIG. 2, at step S208, a second sequence indicating acoustic mouth openness is obtained based on the dynamically generated text and the audio signal. Although FIG. 2 shows that the steps S206 and S208 are executed concurrently, it will be appreciated that steps S206 and S208 can be executed orderly.

Figure 5:
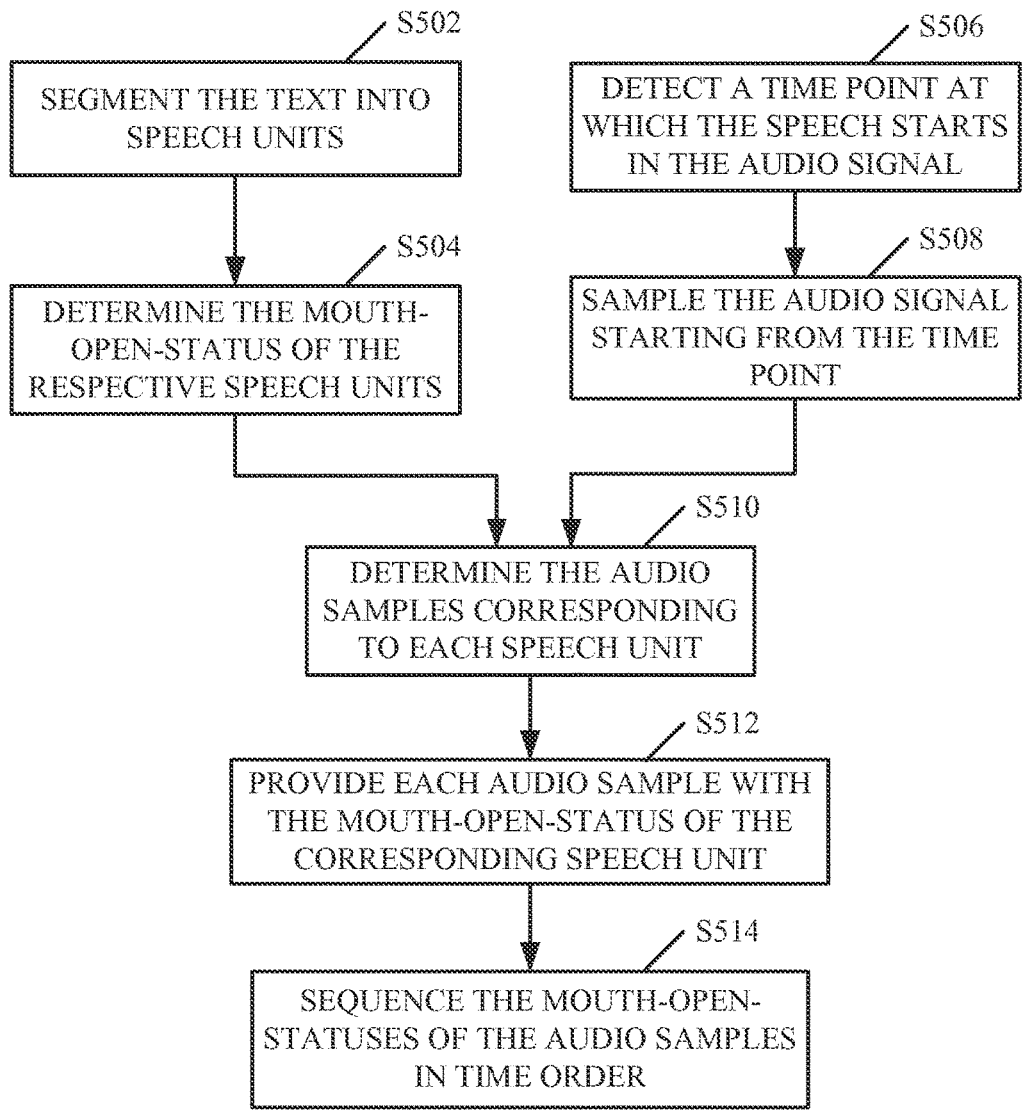
FIG. 5 is a schematic flowchart illustrating the process of obtaining the second sequence, in accordance with embodiments of the present invention.

FIG. 5 shows a schematic flowchart illustrating the process of obtaining the second sequence (step S208). As shown in FIG. 5, at step S502, the dynamically generated text is segmented into speech units. In this embodiment, the speech unit can be a phoneme or a syllable. For example, the phoneme of Chinese can be represented by initials and finals, and the phoneme of English can be represented by phonetic symbols.

Then at step S504, the mouth-open-status of the respective speech units is determined. As known, a pronunciation of a speech unit corresponds to a mouth-open-status. Such correspondence is fixed and known. For example, the pronunciation of the initial "b" in Chinese needs the speaker to open the mouth, then the mouth-open-status of the initial "b" may be set to value 1 which indicates the mouth open. The pronunciation of the final "u" in Chinese needs the speaker to close the mouth, then the mouth-open-status of the final "u" may be set to value 0 which indicates the mouth close. For another example, the pronunciation of the phonetic symbol [a:] in English needs the speaker to open the mouth, then the mouth-open-status of the phonetic symbol [a:] may be set to value 1 which indicates the mouth open. The pronunciation of the phonetic symbol [m] in English needs the speaker to close the mouth, then the mouth-open-status of the phonetic symbol [m] may be set to value 0 which indicates the mouth close.

It will be appreciated that in the case that the mouth-open-status is defined to have more than two values (e.g. three values as above), the mouth-open-status of a speech unit may be set to value 0 if the pronunciation of the speech unit need the speaker to close the mouth, the mouth-open-status of a speech unit may be set to value 1 if the pronunciation of the speech unit need the speaker to open the mouth half, and the mouth-open-status of a speech unit may be set to value 2 if the pronunciation of the speech unit need the speaker to open the mouth fully, The correspondence between the speech unit and the mouth-open-status can be stored, for example, in the form of a lookup table in a database. The mouth-open-status of the speech unit can be obtained by querying the database with the speech unit.

In an example, assume the text is "perfect beer" in English and the speech unit is phoneme. The text can be segmented into 9 phonemes, i.e., "p", "er", "f", "e", "c", "t", "b", "ee", and "r". Then the mouth-open-statuses of 9 phonemes could be determined as "0", "1", "0", "1", "0", "0", "0", "1", and "1", respectively.

In another example, assume the text is "xing qi san" in Chinese and the speech unit is phoneme. The text can be segmented into 6 phonemes, i.e., "x", "ing", "q", "i", "s", and "an". Then the mouth-open-statuses of 6 phonemes could be determined as "1", "0", "1", "1", "0", and "1", respectively.

Then at step S506, a time point at which the speech starts in the audio signal is detected. The time point can be referred to as "start point" hereinafter. Such detection can be implemented by utilizing silence detection technology. The silence detection technology can be used to detect time periods during which there is no voice, which is known to those skilled in the art. The end of the first time period detected is considered as the start point.

Upon the detection of the start point, at step S508, the audio signal is sampled starting from the start point. In order to determine the correspondence between the sampled audio signal and the speech units obtained in step S502 accurately, a silence part of the audio signal before the start point can be removed from the audio signal. Then the audio signal with the silence part removed is sampled.

A sampling time for sampling the audio signal can be varied as required. For example, the sampling time may be 10 ms. Assume that the audio signal is 2 seconds long, and the start point is detected as 120 ms. Then 188 audio samples can be obtained.

Although in the above description steps S502, S504, S506, and S508 are performed sequentially, it will be appreciated that steps S502 and S504 can be performed concurrently with steps S506 and S508.

Generally the number of the audio samples is much larger than the number of the speech units, it is necessary to determine the correspondence between the audio samples and the speech units. At step S510, the audio samples corresponding to each speech unit can be determined. In this step, an acoustic model may be employed to determine similarities between the audio samples and group the audio samples to correspond to the speech units.

Then at step S512, each of the audio samples is provided with the mouth-open-status of the corresponding speech unit. In the above example, assume there are 25 audio samples corresponding to phoneme "x", 64 audio samples corresponding to phoneme "ing", 21 audio samples corresponding to phoneme "q", 25 audio samples corresponding to phoneme "i", 23 audio samples corresponding to phoneme "s", and 30 audio samples corresponding to phoneme "an". The mouth-open-statuses of the first 25 audio samples are "1", the mouth-open-statuses of the next 64 audio samples are "0", the mouth-open-statuses of the next 21 audio samples are "1", the mouth-open-statuses of the next 25 audio samples are "1", the mouth-open-statuses of the next 23 audio samples are "0", and the mouth-open-statuses of the final 30 audio samples are "1".

At step S514, the mouth-open-statuses of all the samples of the audio signal are sequenced in time order to generate the second sequence. In the above example, the second sequence includes 188 mouth-open-statuses with a time length of 1.88 seconds.

Back to FIG. 2, at step S210, synchrony is measured between the first sequence obtained through steps S302 to S306 in step S206 and the second sequence obtained through steps S502 to S514 in step S208. In the step, the synchrony can be represented by a similarity between the first sequence and the second sequence.

Figure 6:
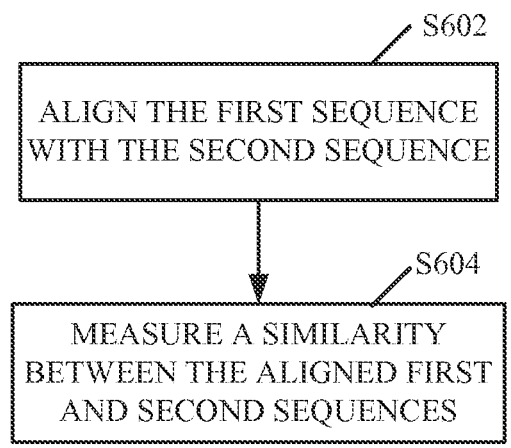
FIG. 6 is a schematic flowchart illustrating the process of measuring synchrony between the first sequence and the second sequence, in accordance with embodiments of the present invention.

FIG. 6 shows the schematic flowchart of the process of measuring synchrony between the first sequence and the second sequence (step S210). As shown in FIG. 6, at step S602, the first sequence is aligned with the second sequence. As described above, the first sequence and the second sequence may be different in term of the time length and/or the amount of the mouth-open-statuses. The sequence alignment is a basis for checking the synchrony.

In step S602, firstly a part of the first sequence is removed from the beginning of the first sequence, such that the remaining of the first sequence has the same time length as the second sequence. As described above, the audio signal may include the silence part at the beginning. In this case, the second sequence is based on the audio signal from which the silence part is removed, and would have the shorter time length than the first sequence. So the part of the first sequence corresponding to the time difference between the time length of the first sequence and the time length of the second sequence is removed from the beginning of the first sequence.

In the above example, the time length of the first sequence is 2 seconds, and the time length of the second sequence is 1.88 seconds. The part of the first sequence corresponding to the time difference of 120 ms is removed from the beginning of the first sequence.

Due to the different sampling times for the video signal and the audio signal, the amount of the mouth-open-statuses of the first sequence is different from that of the second sequence. In order to facilitate the subsequent synchrony check, one of the first and second sequences which has a larger amount of the mouth-open-statuses is down-sampled, such that the amount of the mouth-open-statuses in the down-sampled sequence equals to the amount of the mouth-open-statuses in the other sequence which has a smaller amount of the mouth-open-statuses. In an embodiment, a majority voting algorithm can be utilized for the sequence down-sampling.

Figure 7:
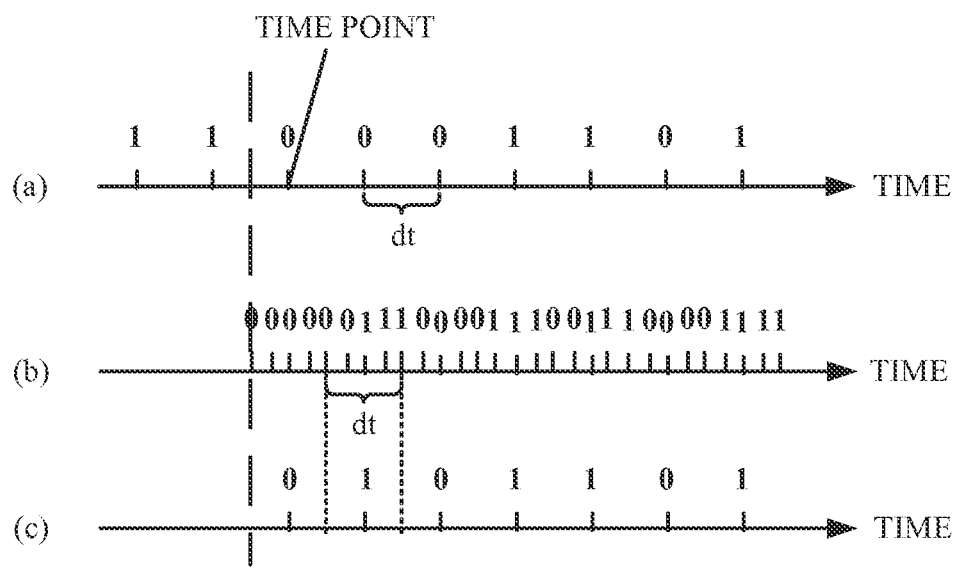
FIG. 7 is a diagram illustrating an example of the sequence alignment, in accordance with embodiments of the present invention.

FIG. 7 shows an example of the sequence alignment. As shown in FIG. 7, the first sequence is shown as "110001101" (see line (a)), and the second sequence is shown as "000000111000011100111100001111" (see line (b)). The time length of the first sequence is longer than the time length of the second sequence. In the alignment, the part of the first sequence corresponding to the difference between the time lengths of the first and second sequence is removed from the beginning of the first sequence. As the number of the mouth-open-statuses of the second sequence is more than that of the first sequence, the second sequence will be down-sampled. The down-sampling is based on the time points of mouth-open-statuses of the first sequence and the time interval (dt) between the two mouth-open-statuses of the first sequence. In the second sequence, the major-voting algorithm is performed on the mouth-open-statuses within each time interval including the time point of the mouth-open-status of the first sequence to obtain a new mouth-open-status at the same time point. The new mouth-open-statuses constitute the aligned second sequence, i.e. "0101101" (see line (c)).

Following the sequence alignment, at step S604, a similarity is measured between the aligned first and second sequences. In this step, firstly the number of the same mouth-open-statuses in the aligned first and second sequences is determined, and then a value of the similarity is calculated as a ratio of the number to the amount of the mouth-open-statuses of one of the aligned first and second sequences. In the example as shown in FIG. 7, the value of the similarity between the first sequence and the aligned second sequence is 6/7.

Although a specific method for the measurement of similarity between two sequences is described herein, those skilled in the art will appreciate that any other method for similarity measurement can also be used.

Back to FIG. 2, at step S212, based on the synchrony measured in step S210, i.e. the calculated value of the similarity, the liveness of the speaker can be determined. If the value of the similarity exceeds a specific threshold, it is determined that the speaker speaks the required text and thus the liveness of the speaker is determined. Otherwise, it is determined that the speaker speaks another text than the required text and thus the liveness of the speaker is not determined.

It can be seen from the above description that the method for liveness detection according to the embodiment of the present invention can determine the liveness of the speaker accurately and distinguish a live person from the recorded video. In addition, the method is user-friendly and easy to implement.

Under the same inventive concept, there is provided a system for visual liveness detection. The system comprises one or more processors, a memory coupled to at least one of the processors and a set of computer program instructions. The set of computer program instructions are stored in the memory and executed by at least one of the processors in order to perform actions of obtaining a video-audio signal related to a speaker speaking a text, splitting the video-audio signal into a video signal which records images of the speaker and an audio signal which records a speech spoken by the speaker, obtaining a first sequence indicating visual mouth openness from the video signal, obtaining a second sequence indicating acoustic mouth openness based on the text and the audio signal, measuring synchrony between the first sequence and the second sequence, and determining liveness of the speaker based on the synchrony.

In an embodiment, the set of computer program instructions when executed performs actions of: sampling the video signal to obtain video frames, determining a mouth-open-status of the speaker for a video frame of the video signal, and sequencing the mouth-open-statuses for the video frames of the video signal in time order to generate the first sequence.

In an embodiment, the set of computer program instructions when executed performs actions of: segmenting the text into speech units, determining a mouth-open-status of the respective speech units, detecting a time point at which the speech starts in the audio signal, sampling the audio signal starting from the time point, determining audio samples of the audio signal corresponding to the respective speech units, providing the audio samples with the respective mouth-open-statuses of the corresponding speech units, and sequencing the mouth-open-statuses of the samples of the audio signal in time order to generate the second sequence.

In an embodiment, the set of computer program instructions when executed performs actions of: aligning the first sequence with the second sequence, and measuring a similarity between the aligned first and second sequences the similarity representing the synchrony.

In an embodiment, the set of computer program instructions when executed performs actions of: removing a part of the first sequence from the beginning of the first sequence such that the remaining of the first sequence has the same time length as the second sequence, and down-sampling one of the first and second sequences which has a larger amount of the mouth-open-statuses, such that the amount of the mouth-open-statuses in the down-sampled sequence equals to the amount of the mouth-open-statuses in the other of the first and second sequences.

In an embodiment, the set of computer program instructions when executed performs actions of: determining the number of the same mouth-open-statuses in the aligned first and second sequences, and calculating a value of the similarity as a ratio of the number to the amount of the mouth-open-statuses of one of the aligned first and second sequences.

Under the same inventive concept, there is provided a computer program product. The computer program product comprises a computer readable storage medium having program instructions embodied therewith. The program instructions are executable by a processor to cause the processor to obtain a video-audio signal related to a speaker speaking a text, to split the video-audio signal into a video signal which records images of the speaker and an audio signal which records a speech spoken by the speaker, to obtain a first sequence indicating visual mouth openness from the video signal, to obtain a second sequence indicating acoustic mouth openness based on the text and the audio signal, to measure synchrony between the first sequence and the second sequence, and to determine liveness of the speaker based on the synchrony.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for visual liveness detection, the method comprising:
    obtaining, by one or more computer processors, a video-audio signal related to a speaker speaking a text;
    splitting, by one or more computer processors, the video-audio signal into a video signal which records images of the speaker and an audio signal which records a speech spoken by the speaker;
    obtaining, by one or more computer processors, a first sequence indicating visual mouth openness from the video signal;
    obtaining, by one or more computer processors, a second sequence indicating acoustic mouth openness based on the text and the audio signal;
    measuring, by one or more computer processors, synchrony between the first sequence and the second sequence; and
    determining, by one or more computer processors, liveness of the speaker based on the synchrony.

2. The method of claim 1, wherein obtaining a first sequence comprises:
    sampling, by one or more computer processors, the video signal to obtain video frames;
    determining, by one or more computer processors, a mouth-open-status of the speaker for a video frame of the video signal; and
    sequencing, by one or more computer processors, the mouth-open-statuses of the video frames of the video signal in time order to generate the first sequence.

3. The method of claim 1, wherein obtaining a second sequence comprises:
    segmenting, by one or more computer processors, the text into speech units;
    determining, by one or more computer processors, a mouth-open-status of the respective speech units;
    detecting, by one or more computer processors, a time point at which the speech starts in the audio signal;
    sampling, by one or more computer processors, the audio signal starting from the time point;
    determining, by one or more computer processors, audio samples of the audio signal corresponding to the respective speech units;
    providing, by one or more computer processors, the audio samples with the respective mouth-open-statuses of the corresponding speech units; and
    sequencing, by one or more computer processors, the mouth-open-statuses of the samples of the audio signal in time order to generate the second sequence.

4. The method of claim 1, wherein measuring synchrony between the first sequence and the second sequence comprises:
    aligning, by one or more computer processors, the first sequence with the second sequence; and
    measuring, by one or more computer processors, a similarity between the aligned first and second sequences, the similarity representing the synchrony.

5. The method of claim 4, wherein aligning the first sequence with the second sequence comprises:
    removing, by one or more computer processors, a part of the first sequence from the beginning of the first sequence such that the remaining of the first sequence has the same time length as the second sequence; and
    down-sampling, by one or more computer processors, one of the first and second sequences which has a larger amount of the mouth-open-statuses, such that the amount of the mouth-open-statuses in the down-sampled sequence equals to the amount of the mouth-open-statuses in the other of the first and second sequences.

6. The method of claim 4, wherein measuring a similarity between the aligned first and second sequences comprises:
    determining, by one or more computer processors, the number of the same mouth-open-statuses in the aligned first and second sequences; and
    calculating, by one or more computer processors, a value of the similarity as a ratio of the number to the amount of the mouth-open-statuses of one of the aligned first and second sequences.

7. A computer system for visual liveness detection, the computer system comprising:
one or more computer readable storage media;
program instructions stored on at least one of the one or more computer readable storage media for execution by at least one of the one or more computer processors, the program instructions comprising:
program instructions to obtain a video-audio signal related to a speaker speaking a text;
program instructions split the video-audio signal into a video signal which records images of the speaker and an audio signal which records a speech spoken by the speaker;
program instructions obtain a first sequence indicating visual mouth openness from the video signal;
program instructions obtain a second sequence indicating acoustic mouth openness based on the text and the audio signal;
program instructions measure synchrony between the first sequence and the second sequence; and
program instructions determine liveness of the speaker based on the synchrony.

8. The computer system of claim 7, wherein the program instructions to obtain a first sequence, further comprises:
program instructions to sample the video signal to obtain video frames;
program instructions to determine a mouth-open-status of the speaker for a video frame of the video signal; and
program instructions to sequence the mouth-open-statuses for the video frames of the video signal in time order to generate the first sequence.

9. The computer system of claim 7, wherein the program instructions to obtain a second sequence, further comprises:
program instructions to segment the text into speech units;
program instructions to determine a mouth-open-status of the respective speech units;
program instructions to detect a time point at which the speech starts in the audio signal;
program instructions to sample the audio signal starting from the time point;
program instructions to determine audio samples of the audio signal corresponding to the respective speech units;
program instructions to provide the audio samples with the respective mouth-open-statuses of the corresponding speech units; and
program instructions to sequence the mouth-open-statuses of the samples of the audio signal in time order to generate the second sequence.

10. The computer system of claim 7, wherein the program instructions to measure synchrony between the first sequence and the second sequence, further comprises:
program instructions to align the first sequence with the second sequence; and
program instructions to measure a similarity between the aligned first and second sequences, the similarity representing the synchrony.

11. The computer system of claim 10, wherein the program instructions to align the first sequence with the second sequence, further comprises:
program instructions to remove a part of the first sequence from the beginning of the first sequence such that the remaining of the first sequence has the same time length as the second sequence; and
program instructions to down-sample one of the first and second sequences which has a larger amount of the mouth-open-statuses, such that the amount of the mouth-open-statuses in the down-sampled sequence equals to the amount of the mouth-open-statuses in the other of the first and second sequences.

12. The computer system of claim 10, wherein program instructions to measure a similarity between the aligned first and second sequences, the similarity representing the synchrony, further comprises:
program instructions to determine the number of the same mouth-open-statuses in the aligned first and second sequences; and
program instructions to calculate a value of the similarity as a ratio of the number to the amount of the mouth-open-statuses of one of the aligned first and second sequences.

13. A computer program product for visual liveness detection, the computer program product comprising:
one or more computer readable storage media and program instructions stored on the one or more computer readable storage media, the program instructions comprising:
program instructions to obtain a video-audio signal related to a speaker speaking a text;
program instructions to split the video-audio signal into a video signal which records images of the speaker and an audio signal which records a speech spoken by the speaker;
program instructions to obtain a first sequence indicating visual mouth openness from the video signal;
program instructions to obtain a second sequence indicating acoustic mouth openness based on the text and the audio signal;
program instructions to measure synchrony between the first sequence and the second sequence; and
program instructions to determine liveness of the speaker based on the synchrony.

14. The computer program product of claim 13, wherein the program instructions to obtain a first sequence, further comprises:
program instructions to sample the video signal to obtain video frames;
program instructions to determine a mouth-open-status of the speaker for a video frame of the video signal; and
program instructions to sequence the mouth-open-statuses for the video frames of the video signal in time order to generate the first sequence.

15. The computer program product of claim 13, wherein the program instructions to obtain a second sequence, further comprises:
program instructions to segment the text into speech units;
program instructions to determine a mouth-open-status of the respective speech units;
program instructions to detect a time point at which the speech starts in the audio signal;
program instructions to sample the audio signal starting from the time point;
program instructions to determine audio samples of the audio signal corresponding to the respective speech units;
program instructions to provide the audio samples with the respective mouth-open-statuses of the corresponding speech units; and
program instructions to sequence the mouth-open-statuses of the samples of the audio signal in time order to generate the second sequence.

16. The computer program product of claim 13, wherein the program instructions to measure synchrony between the first sequence and the second sequence, further comprises:

program instructions to align the first sequence with the second sequence;

program instructions to measure a similarity between the aligned first and second sequences, the similarity representing the synchrony.

17. The computer program product of claim 16, wherein the program instructions to align the first sequence with the second sequence, further comprises:

program instructions to remove a part of the first sequence from the beginning of the first sequence such that the remaining of the first sequence has the same time length as the second sequence; and program instructions to down-sample one of the first and second sequences which has a larger amount of the mouth-open-statuses, such that the amount of the mouth-open-statuses in the down-sampled sequence equals to the amount of the mouth-open-statuses in the other of the first and second sequences.

18. The computer program product of claim 16, wherein program instructions to measure a similarity between the aligned first and second sequences, the similarity representing the synchrony, further comprises:

program instructions to determine the number of the same mouth-open-statuses in the aligned first and second sequences; and program instructions to calculate a value of the similarity as a ratio of the number to the amount of the mouth-open-statuses of one of the aligned first and second sequences.

* * * * *